United States Patent [19]

Kobayashi

[11] Patent Number: 4,787,468
[45] Date of Patent: Nov. 29, 1988

[54] SYSTEM FOR TRANSMITTING POWER OF AN ENGINE TO DRIVING WHEELS OF A MOTOR VEHICLE

[75] Inventor: Toshio Kobayashi, Tokyo, Japan

[73] Assignee: Fuji Jukogyo Kabushiki Kaisha, Tokyo, Japan

[21] Appl. No.: 75,101

[22] Filed: Jul. 20, 1987

[30] Foreign Application Priority Data

Jul. 26, 1986 [JP] Japan .................. 61-176483

[51] Int. Cl.$^4$ ............................................. F16H 37/10
[52] U.S. Cl. ...................................... 180/70.1; 74/695
[58] Field of Search .................. 180/336, 70.1, 315; 74/606 R, 694, 695

[56] References Cited

U.S. PATENT DOCUMENTS

| 4,210,220 | 7/1980 | Balter | 180/70.1 |
| 4,518,370 | 5/1985 | Orain | 180/70.1 |
| 4,643,045 | 2/1987 | Katayama | 74/695 |
| 4,671,135 | 6/1987 | Dangel | 74/694 |
| 4,673,055 | 6/1987 | Yamaoka et al. | 180/70.1 |
| 4,745,819 | 5/1988 | Kano et al. | 74/694 |

FOREIGN PATENT DOCUMENTS 58-24289  5/1983  Japan .

Primary Examiner—Richard A. Bertsch
Attorney, Agent, or Firm—Martin A. Farber

[57] ABSTRACT

A power transmission system has an automatic transmission of a trans-axle type and differential provided between axles of driving wheels of a vehicle. The automatic transmission has a drive pinion shaft having a drive pinion engaged with a ring gear of the differential. An axial center of an input shaft of the transmission and a center of the differential with respect to the horizontal direction is positioned on a vertical line, and a center of the drive pinion shaft is deviated from the vertical line in a lateral direction, whereby the center of the differential is positioned at a central position with respect to the width of the vehicle.

10 Claims, 6 Drawing Sheets

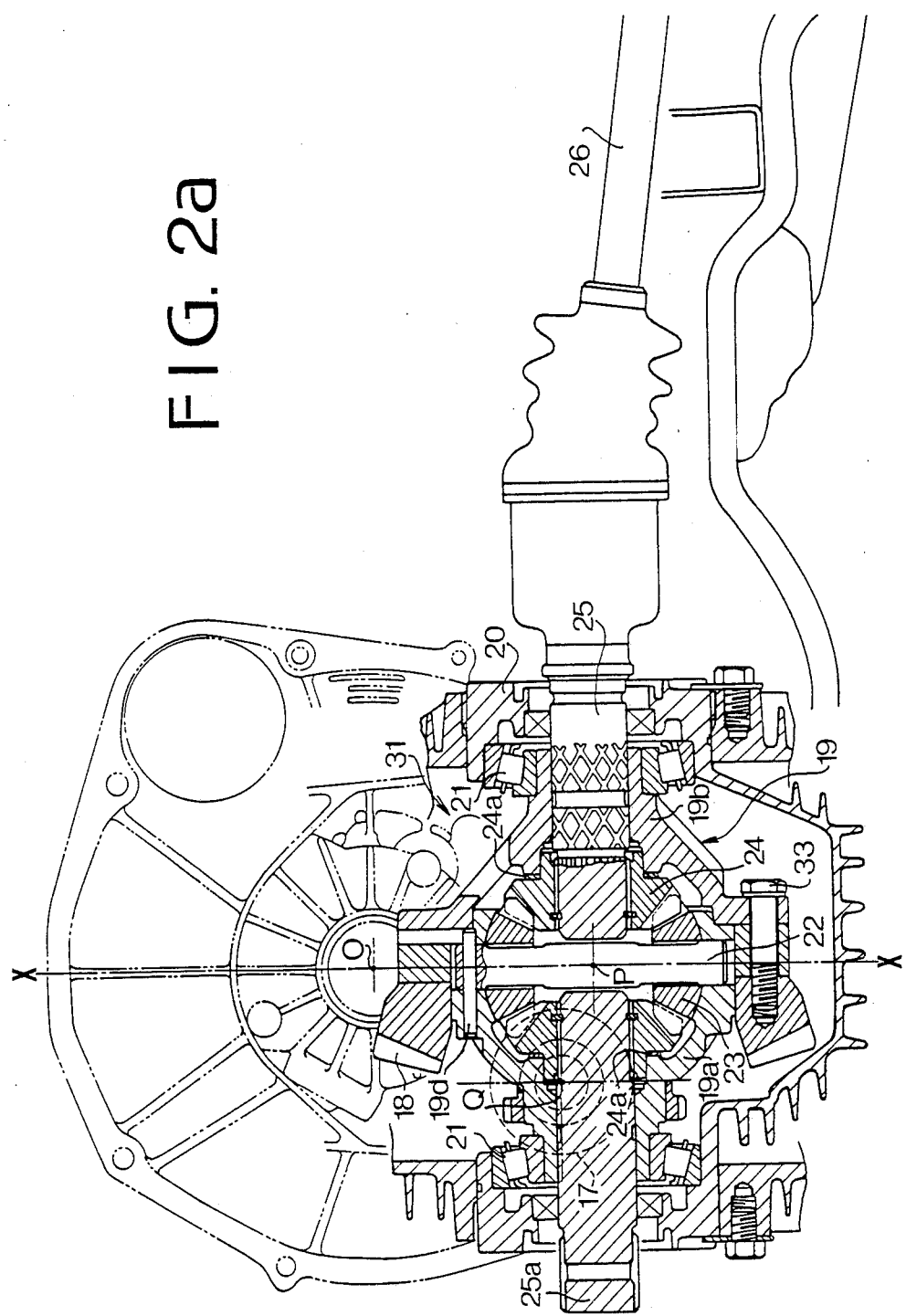

SYSTEM FOR TRANSMITTING POWER OF AN ENGINE TO DRIVING WHEELS OF A MOTOR VEHICLE

BACKGROUND OF THE INVENTION

The present invention relates to a system for transmitting power of an engine to driving wheels of a motor vehicle, and more particularly to a trans-axle type automatic transmission, an input shaft of which extends across an axle of the vehicle.

A trans-axle type automatic transmission has a torque converter for transmitting the power of an engine, an automatic transmission device having an input shaft operatively connected to the torque converter, a drive pinion shaft disposed in parallel with the input shaft, and a drive pinion formed on an end of the drive pinion shaft being engaged with a ring gear of a differential provided in an axle system. Vertical, longitudinal and lateral dimensions of the automatic transmission must be determined with consideration to structure and form of the vehicle, effect on braking operation of the vehicle, reliability, and oscillation of the axle system, noise and driveability. For example, it is necessary to minimize the horizontal distance between the front end of the engine and the axle shaft connected to the differential in order to reduce the minimum turning outer radius. Lateral and vertical relative positions of the centers of the differential and tires are also significant a regarding braking effect and strength and durability of the axle shaft. The longitudinal distance from the front end of the engine to the axle shaft, and the vertical distance between the axle shaft and the top of the engine are preferably reduced to provide a slant-nosed form of the body of the vehicle, ensuring improved aerodymanic characteristics. Additionally the vertical distance between the crankshaft and a bottom of a housing of the automatic transmission device must also be minimized for better ground clearance, resulting in improvement in driveability.

One of the conventional arrangements of the trans-axle type transmission is disclosed in Japanese Patent Publication 58-24289. In the arrangement, the crankshaft and the drive pinion shaft of the differential are disposed in parallel with each other so that axial centers thereof are positioned in a vertical plane. In order to reduce the above described dimensions, the differential is deviated to one side from the longitudinal center line of the vehicle. Accordingly, lengths and hence angles at universal joints of the right and left axle are not equal to each other, causing oscillation of the steering wheel, deviation from a course and an unbalanced braking effect. In order to prevent these troubles, a damper is provided on the longer axle shaft.

However, provision of the damper not only results in increase in the number of parts and cost, but requires a difficult fine tuning operation and hence unpreferable for maintenance of the axle system. But if the differential is disposed at a central position with respect to the width of the vehicle, the vertical distance between the differential and the input shaft increases. This is because since the axis of the drive pinion shaft must be in parallel to that of the crankshaft to maintain a certain distance between the drive pinion shaft and components of the automatic transmission device, the center of the drive pinion shaft must be on an arc having the axis of the crankshaft as the center.

SUMMARY OF THE INVENTION

The object of the present invention is to provide an automatic transmission wherein the differential is positioned at the center of the vehicle with respect to width thereof without increasing the height of the automatic transmission.

According to the present invention, there is provided a system for transmitting power of an engine to driving wheels of a motor vehicle having an automatic transmission of a trans-axle type and differential provided between axles of the driving wheels, and the automatic transmission having an input shaft, a drive pinion shaft having a drive pinion engaged with a ring gear of the differential.

The system of the invention is characterized in that a center of the input shaft of the transmission and a center of the differential with respect to the horizontal direction are positioned on a vertical line, and a center of the drive pinion shaft is deviated from the vertical line in a lateral direction, so that the center of the differential is positioned at a central position with respect to width of the vehicle.

The other objects and features of this invention will be apparently become understood from the following description with reference to the accompanying drawings.

BRIEF DESCRIPTION OF DRAWINGS

FIGS. 2a and 2b show a sectional view taken along a line II—II of FIG. 1a; and

DETAILED DESCRIPTION OF THE PREFERRED EMBODIMENT

Figure 1A:
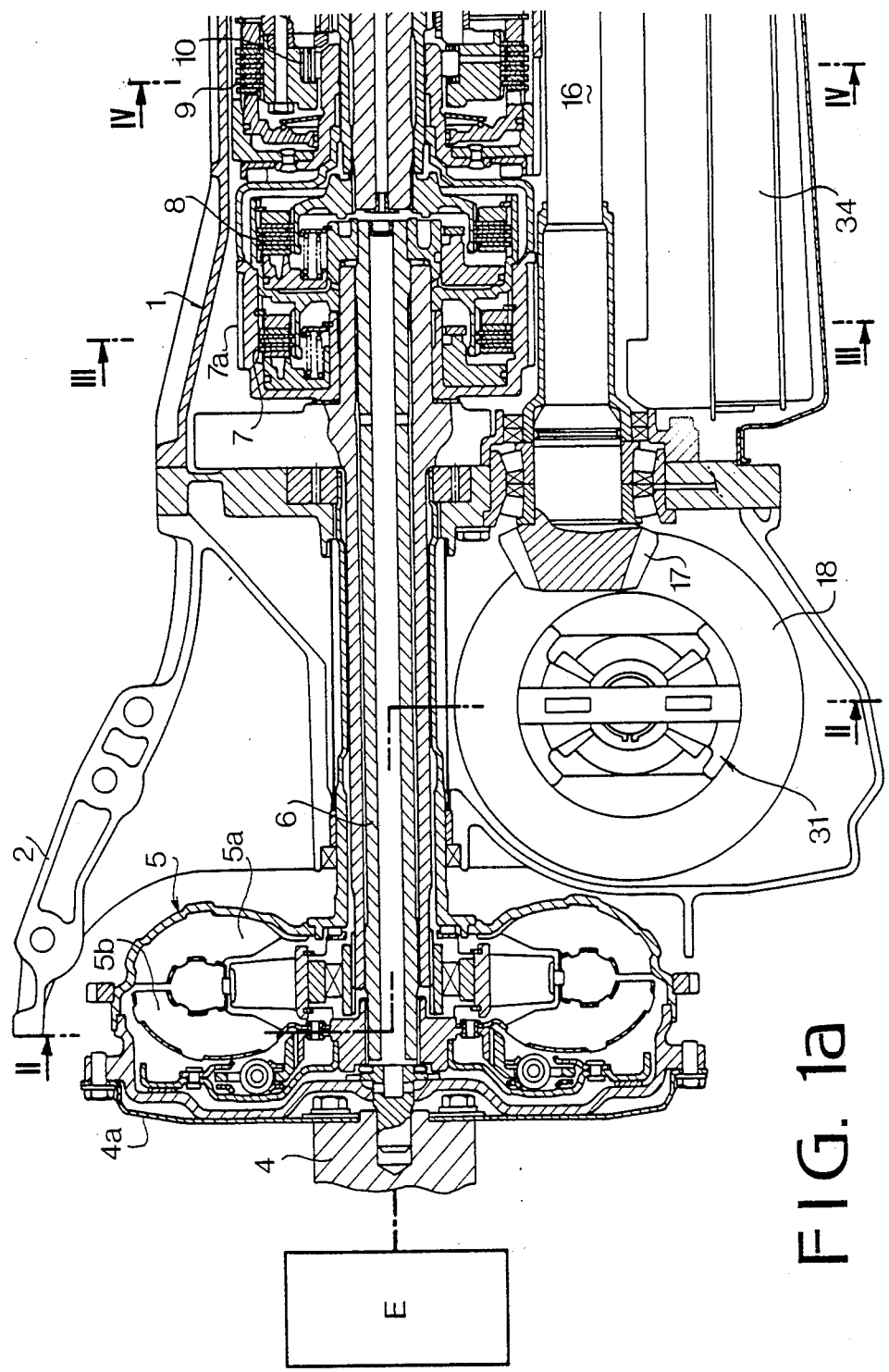
FIGS. 1a and 1b show an automatic transmission according to the present invention in section.
Figure 1B:
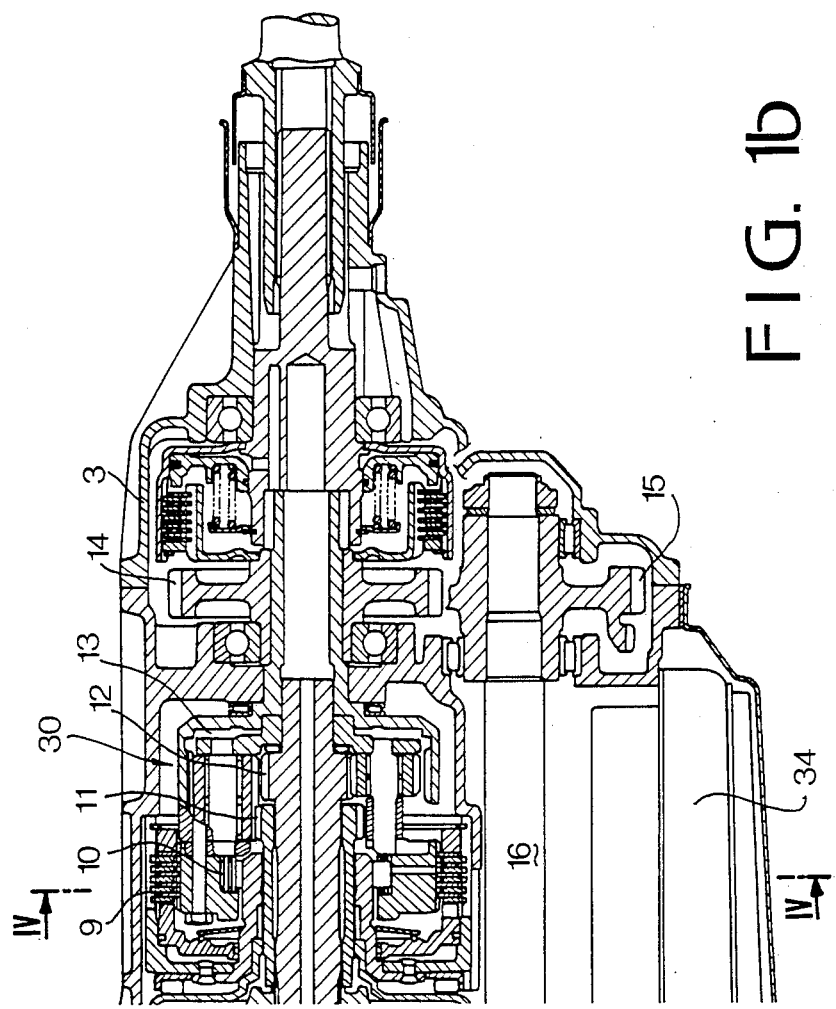

Referring to FIGS. 1a, 1b, 2a and 2b, the automatic transmission has a transmission case 1, a pair of torque converter covers 2 secured to an engine block (not shown), and an extension case 3. A crankshaft 4 of an engine E is connected to an impeller 5a of a torque converter 5 through a drive plate 4a. A turbine 5b of the torque converter is connected to an input shaft 6 which is operatively connected to an automatic transmission device 30 in the transmission case 1. The automatic transmission device 30 has a reverse clutch 7 provided with a brake band 7a, forward clutch 8, low and reverse brake 9, one-way clutch 10, and a planetary gear device including reverse sun gear 11, forward sun gear 12, and ring gear 13. The ring gear 13 is connected to a reduction drive gear 14 in the extension case 3. The reduction drive gear 14 is engaged with a reduction driven gear 15 which is secured to a rear portion of a an output shaft namely drive pinion shaft 16. The drive pinion shaft 16 is disposed in substantially parallel to the input shaft 6. A drive pinion 17 at the front end of the drive pinion shaft 16 is engaged with a ring gear 18 of a front differential 31 disposed in a lower portion of the torque converter cover 2. Provided under the drive pinion shaft 16 in the transmission case 1 is an oil pressure control unit 34.

Figure 2B:
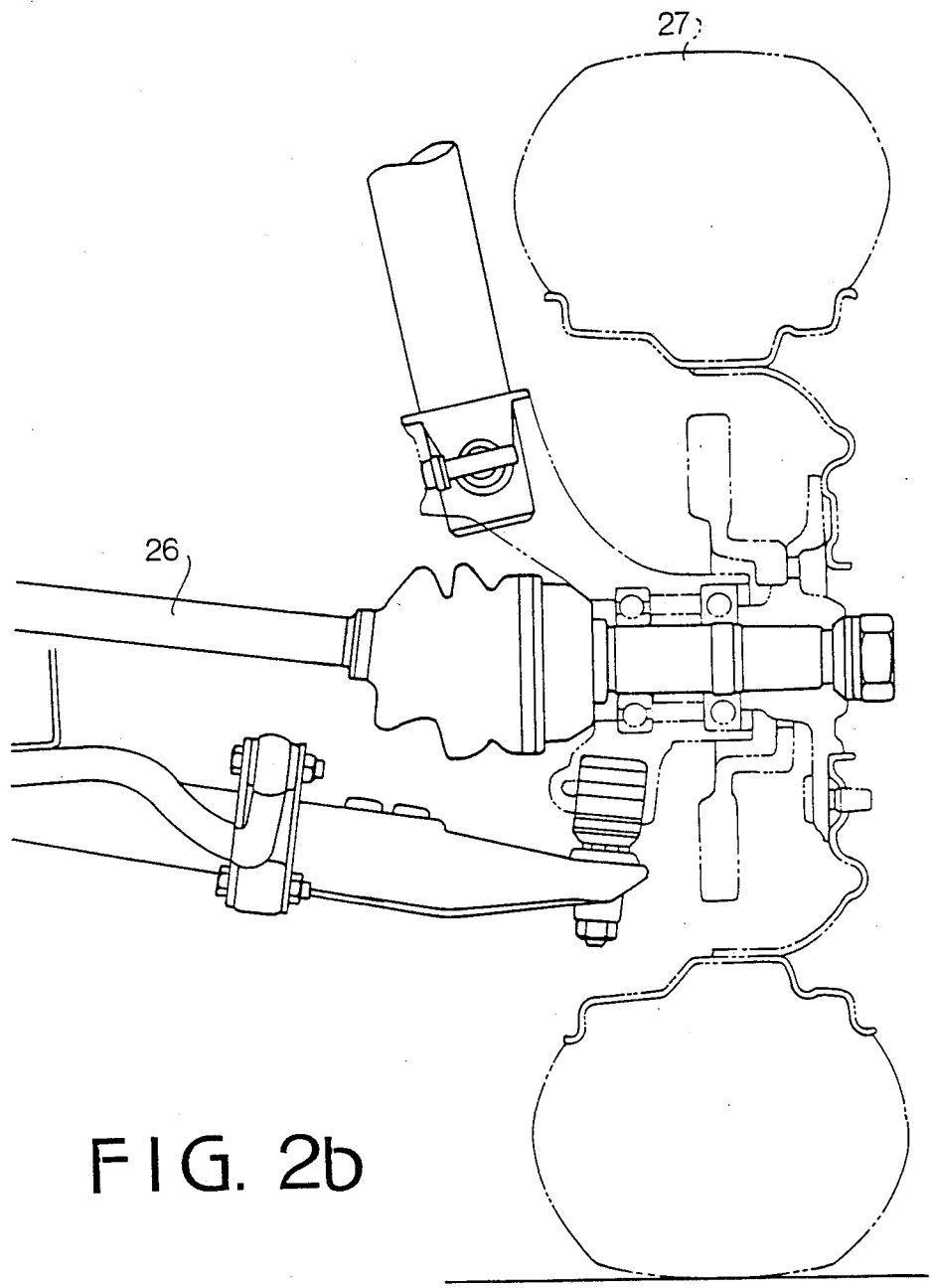

FIGS. 2a and 2b show the right side portion of the vehicle as viewed from the front of the vehicle.

The differential 31 comprises a differential case 19, a pair of pinion gears 23 and a pair of side gears 24 meshing with the pinion gears 23. The ring gear 18 is fixed to the case by bolts 33. The differential case 19 is divided into right and left portions 19a and 19b so as to easily adjust backlashes formed between toothings of the pinion gears 23 and side gears 24. Each of the portions 19a and 19b is rotatably supported in the axle holders 20 through a bearing 21. The side gears 24 are mounted on front drive shafts 25 and 25a through spline engagements respectively and the pinion gears 23 are mounted on a pinion gear shaft 22 which is disposed perpendicularly to the drive shaft 25 and secured to the case 19. Each of drive shafts 25 and 25a is connected to an axle shaft 26 through a universal joint so as to transmit the power of the engine E to the front wheels 27. The pinion shaft 22 is held by a straight pin 19d to prevent the shaft 22 from rotating.

Washers 24a, the thickness of which is adjustable, are provided between each side gear 24 and the differential case 19 so as to adjust the backlashes between the pinion gears 23 and side gears 24.

Figure 3:
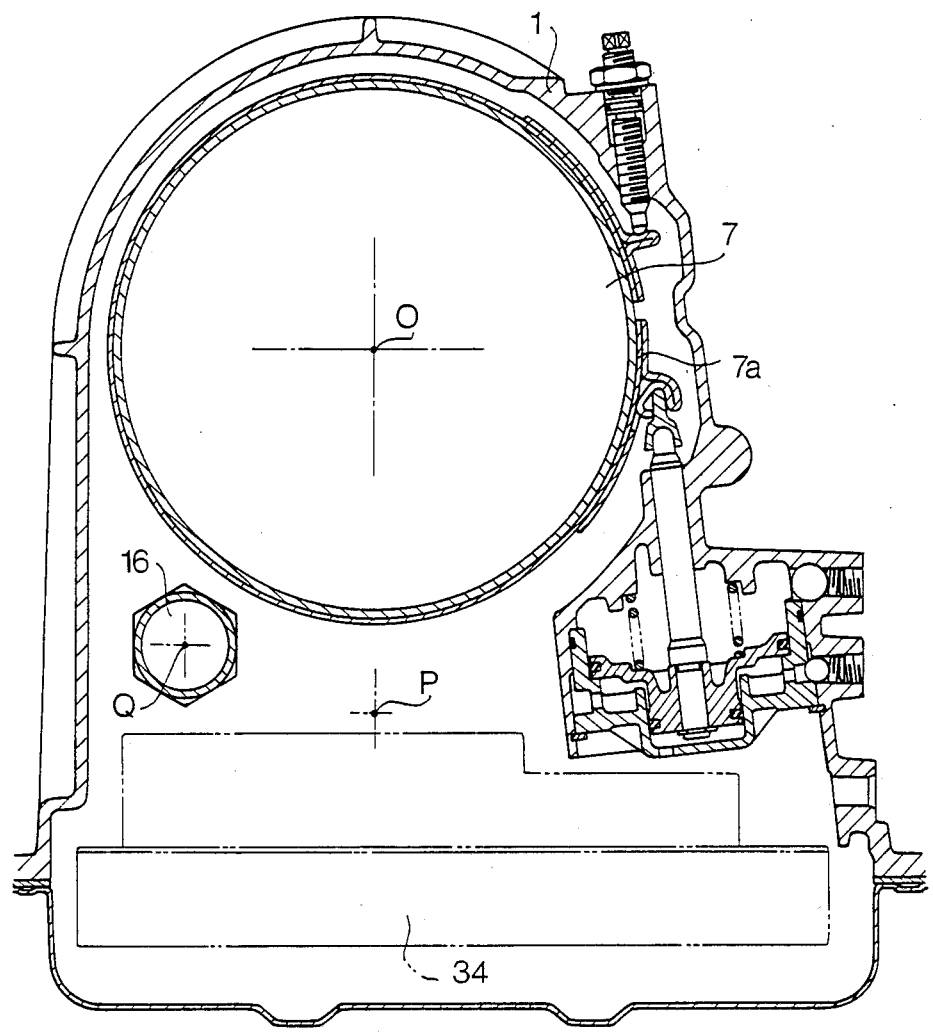
FIGS. 3 and 4 are sectional views taken along lines III—III and IV—IV of FIG. 1a, respectively.
Figure 4:
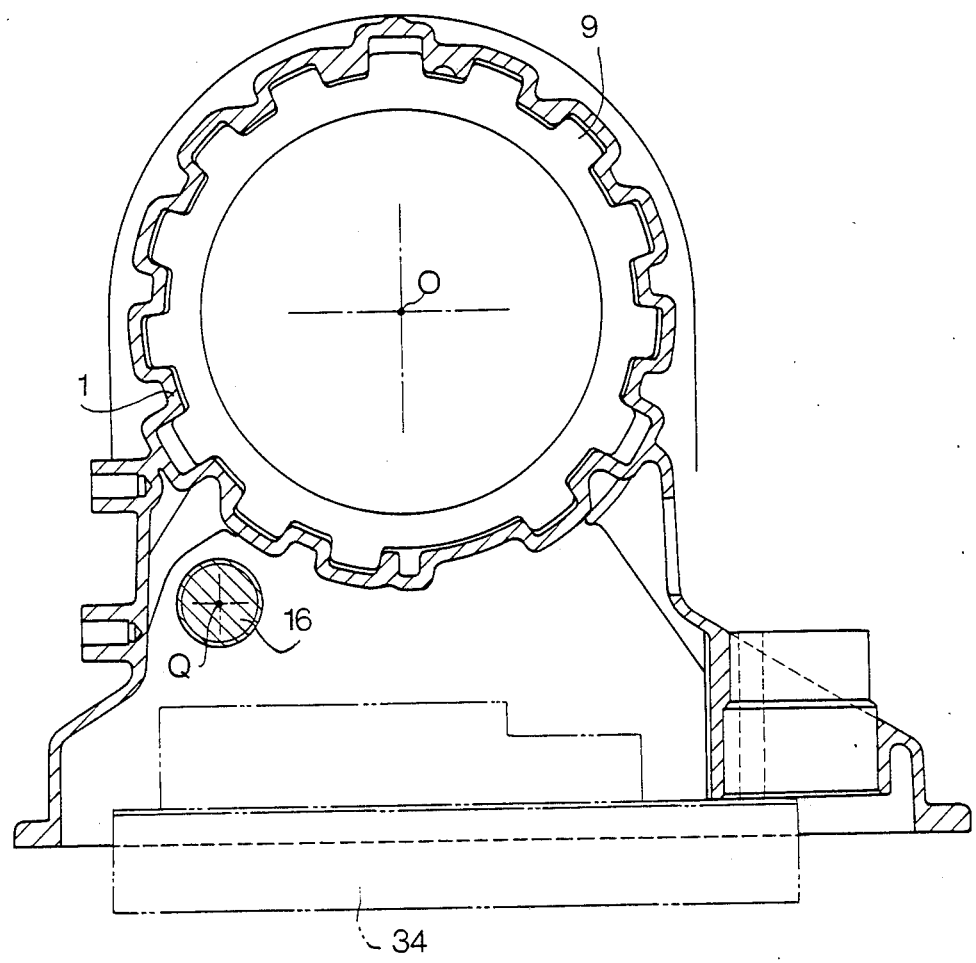

In such a construction, the center "O" of the input shaft 6 and the center "P" of the differential 31 with respect to the horizontal direction, are on a vertical line (or plane) X—X as shown in FIG. 2a. However, the center "Q" of the drive pinion shaft 16 is deviated from the line X—X in a lateral direction. Thus, the center P of the differential 31 is located at a central position with respect to the width of the vehicle. As shown in FIGS. 3 and 4, the brake band 7a and the low and reverse brake 9 are the components having largest diameter in the automatic transmission device 30. Thus, the drive pinion shaft 16 can be disposed in a space between the automatic transmission device 30 and the oil pressure control unit 34. As a result, the vertical distance between the centers "O" and "P" is shortened while keeping the necessary distance between the drive pinion shaft 16 and the automatic transmission device 30.

Since the drive pinion shaft 16 is arranged at one side of the vehicle (the left side in the embodiment), the differential 31 is placed in the central position relative to the width of the vehicle. Accordingly, the lengths of the right and left axles are equal. Joint angles are also equal so that a damper is not necessary.

From the foregoing it will be understood that in an automatic transmission of the present invention, the right and left axles are equal in length so that troubles such as oscillation of the steering wheel, deviation, unbalanced and braking effect are prevented without providing a damper on one of the axle shafts.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A system for transmitting power of an engine to driving wheels of a motor vehicle having an automatic transmission of a trans-axle type and differential provided between axles of the driving wheels, and the automatic transmission having an input shaft operatively connected to a crankshaft of the engine, a drive pinion shaft as an output shaft of the transmission, and a drive pinion formed on the drive pinion shaft and engaged with a ring gear of the differential, the system comprising:

a center of the input shaft of the transmission and a center of the differential with respect to the horizontal direction being positioned on a vertical plane; and a center of the drive pinion shaft being deviated from the vertical plane in a lateral direction, and the center of the differential is positioned at a central position with respect to width of the vehicle.

2. The system according to claim 1, wherein the automatic transmission further having an automatic transmission device including a planetary gear device and a torque converter provided between the crankshaft and the automatic transmission device.

3. In an automatic transmission system for transmitting power of an engine to driving wheels of a motor vehicle, the system having a differential for differentiating rotational speed between the driving wheels, an automatic transmission including an input shaft operatively connected to the engine, an output shaft, and a gear device for transmitting power of the engine from the input shaft to the output shaft, and an oil pressure control unit actuating the gear device, and the differential including drive shafts connected with the driving wheels, respectively, and a ring gear connected to the output shaft, the improvement in the system comprising:

the input shaft being positioned at a position in a vertical plane passing through a center with respect to a lateral direction of the vehicle;

the output shaft being positioned at a positioned deviated from the vertical plane and disposed in a space between the gear device and the oil pressure control unit decreasing distance between the input shaft and the differential with respect to vertical direction of the vehicle while keeping a necessary distance between the output shaft and said automatic transmission;

a drive pinion provided on the output shaft engaging with the ring gear; and the differential being positioned with an axis thereof at a position in the vertical plane with decreased height of the system so as to improve driveability of the vehicle.

4. The system according to claim 3, wherein said differential having side gears and pinion gears meeting with each other, a differential case and a pinion gear shaft secured to said case, said pinion gears are mounted on said pinion gear shaft, and said ring gear is fixed to said differential case, and said side gears on mounted on said drive shafts, said pinion gear shaft is oriented perpendicularly to said drive shafts.

5. The system according to claim 4, wherein said pinion gear shaft is rotatably is disposed in said vertical plane rotatable about an axis of said drive shafts, the axis of said drive shafts is coaxial to an axis of said ring gear and perpendicular to said axis of said differential.

6. The system according to claim 3, wherein the input shaft and output shaft and said axis of the differential are horizontal, longitudinal with respect to the vehicle and substantially parallel to each other, and said axis of the differential is perpendicular to a central axis of said ring gear.

7. The system according to claim 3, further comprising a torque converter connected between a crank shaft of the engine and the input shaft, said differential is positioned between said torque converter and said output shaft.

8. The system according to claim 3, wherein a center line of the output shaft forms a substantially right angle with respect to a center line of the input shaft and the axis of the differential.

9. The system according to claim 3, wherein the oil pressure control unit is below said output shaft and said output shaft and said differential are below said input shaft.

10. The system according to claim 3, wherein said drive pinion engages said ring gear at a substantially rearward-most portion of said ring gear.

* * * * *